United States Patent [19]
Deeks

[11] Patent Number: 5,951,802
[45] Date of Patent: Sep. 14, 1999

[54] VEHICLE TRIM PANEL

[75] Inventor: Alan Robert Deeks, Maidstone, United Kingdom

[73] Assignee: Marley Automotive Components Limited, United Kingdom

[21] Appl. No.: 08/630,576

[22] Filed: Apr. 10, 1996

[30] Foreign Application Priority Data

Apr. 11, 1995 [GB] United Kingdom .................... 9507506

[51] Int. Cl.⁶ ........................... B29C 43/04; B29C 51/00; B29C 65/00
[52] U.S. Cl. .......................... 156/214; 156/228; 156/245; 156/256; 156/267
[58] Field of Search .................................. 156/214, 228, 156/267, 245, 222, 256; 269/39.1

[56] References Cited

U.S. PATENT DOCUMENTS

| | | | |
|---|---|---|---|
| 2,797,179 | 6/1957 | Reynolds et al. | 156/219 |
| 3,075,862 | 1/1963 | Hoyer | 156/222 |
| 4,740,417 | 4/1988 | Tornero . | |
| 4,781,956 | 11/1988 | Zimmerman . | |
| 4,810,452 | 3/1989 | Taillefert et al. . | |
| 4,882,002 | 11/1989 | Ando et al. | 156/214 |
| 4,938,912 | 7/1990 | Pelzer . | |
| 5,091,031 | 2/1992 | Strapazzini . | |
| 5,397,409 | 3/1995 | Kornylo . | |
| 5,462,786 | 10/1995 | Van Ert | 156/245 |

FOREIGN PATENT DOCUMENTS

| | | |
|---|---|---|
| A-0 348 357 | 12/1989 | European Pat. Off. . |
| A-0 482 270 | 4/1992 | European Pat. Off. . |
| A-0 553 795 | 8/1993 | European Pat. Off. . |
| A-0 676 267 | 10/1995 | European Pat. Off. . |
| 1 415 852 | 11/1975 | United Kingdom . |
| 2 025 833 | 1/1980 | United Kingdom . |
| 2 206 835 | 1/1989 | United Kingdom . |
| 2 271 956 | 5/1994 | United Kingdom . |

OTHER PUBLICATIONS

*Molding Method of Ornamental Object*; Patent Abstracts of Japan; vol. 7, No. 31 (M–192), Feb. 8, 1983 & JP 57 187229 A (Toyoda Gosei KK), Nov. 17, 1982.

*Primary Examiner*—Richard Crispino
*Attorney, Agent, or Firm*—Bacon & Thomas PLLC

[57] ABSTRACT

A method for making a vehicle trim panel includes bonding an interior lining material to a preformable foam sheet and preforming the bonded lining material and foam sheet to provide a preformed blank, and joining the preformed blank to a second lining material and bonding both the preformed blank and the second lining material to a substrate to make the vehicle trim panel.

15 Claims, 2 Drawing Sheets

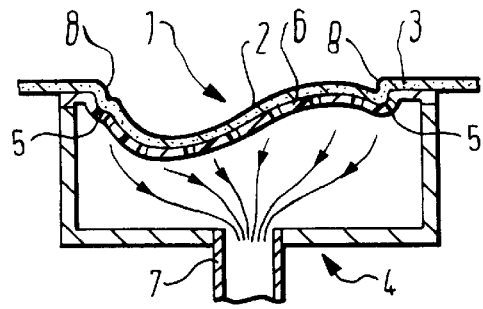
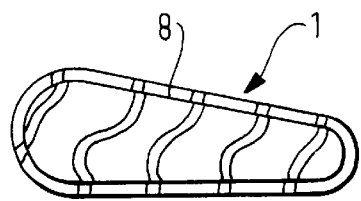
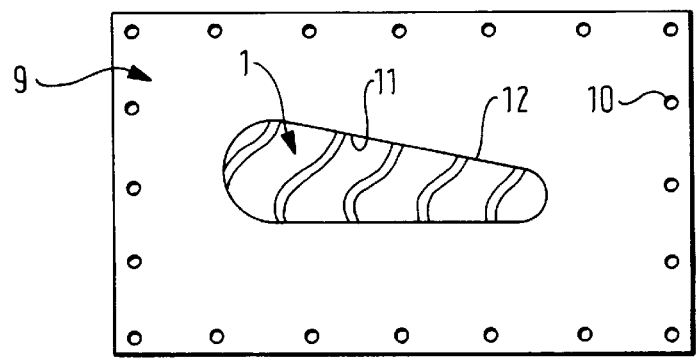
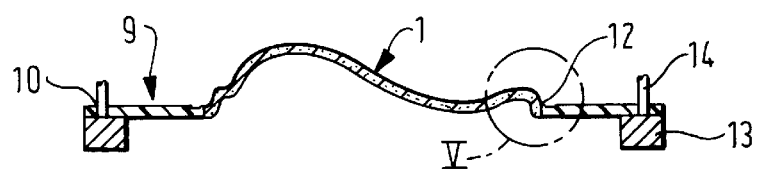
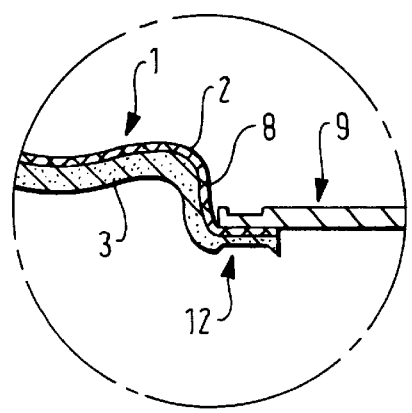

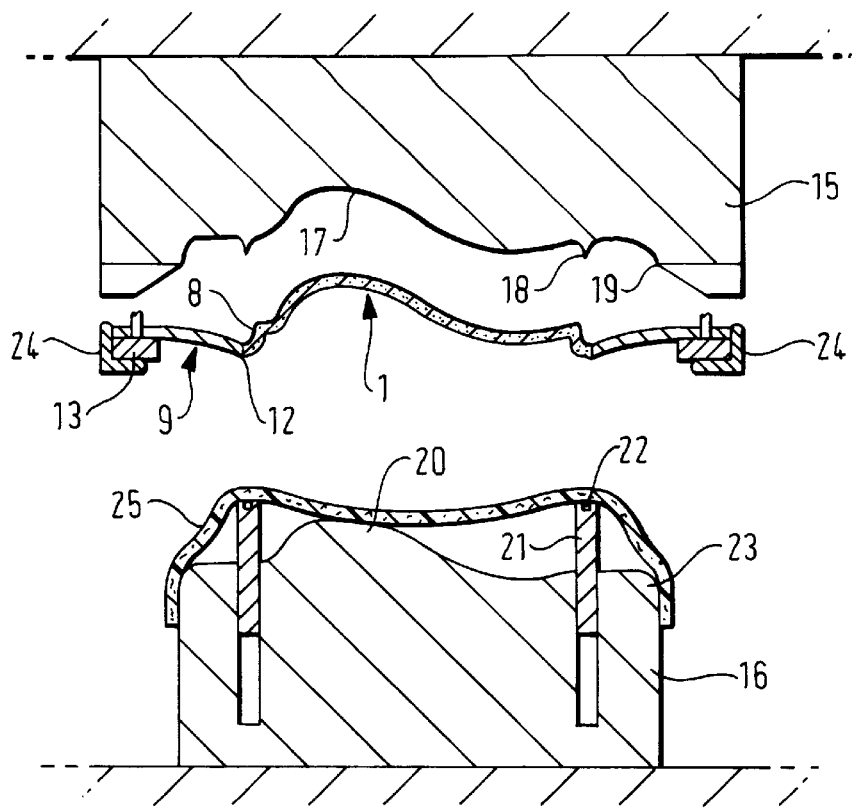
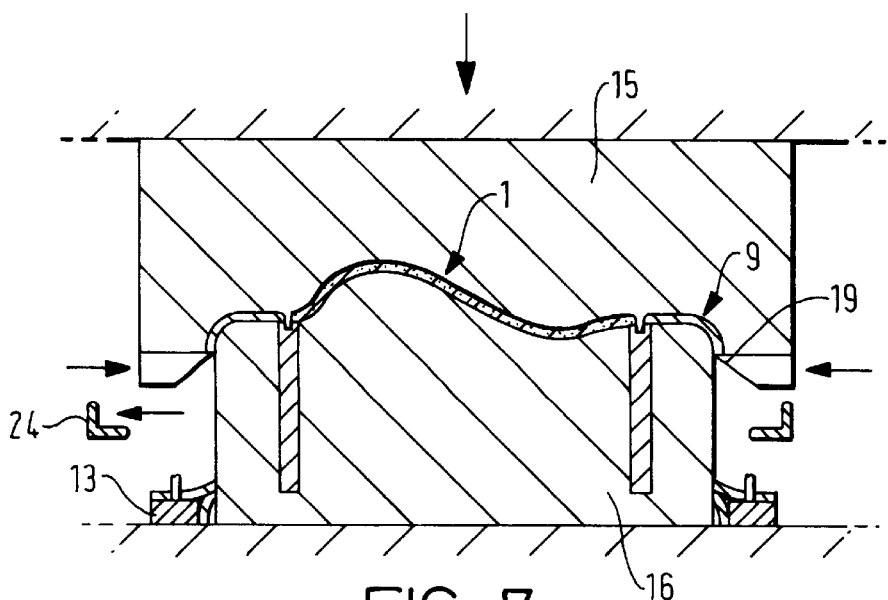
FIG. 6
FIG. 7

VEHICLE TRIM PANEL

This invention relates to a vehicle trim panel and to a method of making such a panel.

It is known to make a vehicle trim panel in which an interior lining material, such as a woven or nonwoven fabric or a plastic or natural material, is bonded to a foam sheet to form a blank which is then bonded to a substrate of relatively rigid material such as plastics or fibre board or the like. The panel is generally non-planar and has a contoured shape in which it remains by virtue of the rigidity of the substrate.

It can sometimes be difficult to ensure that the blank of lining material and foam forms the shape required and bonds to the substrate in the correct position. For example, a first lining material may be surrounded by a second lining material (when the panel 20 is viewed in plan, i.e. from the vehicle interior), with the first lining material forming the interior lining of a contoured recess in the panel. It is then important from the point of view of the appearance of the panel that the junction between the two lining materials follows exactly the defined edge of the recess. One way of achieving this is for a first substrate portion formed with the contoured recess to be lined with the first lining material, a second substrate portion formed with a cut-out hole or a corresponding contoured recess to be lined with the second lining material, and then the first substrate portion to be placed in the hole or contoured recess of the second substrate portion and adhered thereto. However, the use of two substrate portions is inconvenient and costly and it is preferable if possible to line a single substrate with the two lining materials.

Viewed from one aspect the invention provides a method of making a vehicle trim panel, comprising bonding an interior lining material to a preformable foam sheet to form a blank, preforming the blank so that it adopts a contoured shape, and bonding the preformed blank to a substrate.

Viewed from another aspect the invention provides a vehicle trim panel comprising an interior lining material bonded to a preformable foam sheet which has been preformed to a contoured shape, the foam sheet being bonded to a substrate.

Thus, a preformable foam sheet is used instead of a conventional foam sheet adhered to the interior lining material and is preformed to a desired contoured shape corresponding to the final shape of the panel. With this arrangement the shape of the blank is determined before it is bonded to the substrate and this greatly assists achieving the desired form and the correct positioning of the blank relative to the substrate.

The preformable foam sheet may for example be polypropylene or polyethylene, in contrast to a standard foam sheet such as polyurethane. The thickness of the preformable foam sheet, typically a few millimetres, enables it to hold to the preformed shape in a very effective manner.

Preforming of the blank is preferably effected by vacuum forming. A preferred method comprises heating the blank, placing it on a vacuum forming tool which deforms it to the desired contoured shape, and then allowing it to cool. The blank, preformed in this way, retains the contoured shape.

The blank will normally be oversized prior to preforming. When it takes up the contoured shape during the preforming process, material can simply be drawn in at the edges, so that the contoured shape can be formed without any significant stretching. This is particularly advantageous where the interior lining material is one which can only stretch by a small amount before tearing, such as a woven fabric or a plastic or natural material such as leather. Certain woven fabrics can only stretch by about 3–6% before damage occurs.

In one method, the substrate may be preformed to have a contoured shape corresponding generally to that of the preformed blank and the two are then bonded together. The fact that both the blank and the substrate are preformed with corresponding shapes assists the correct relative positioning when they are brought together. In another method, the substrate may be injection moulded to form a backing to the preformed blank. This is possible because the blank is already preformed with the desired contoured shape.

In the presently preferred method, the bonding of the preformed blank to the substrate takes place between first and second pressing tools. Thus, for example, the preformed blank and the substrate are supported between first and second pressing tools which are brought together in a pressing operation, the substrate being pressed to shape it and the preformed blank being bonded thereto during said pressing operation. In this method, by preforming the blank with substantially the same contoured shape as the pressing tool which engages it during the pressing operation, even if the blank is not initially supported in precisely the right position, any misalignment tends to be corrected as the blank is engaged by the pressing tool. Thus it will be correctly positioned on the substrate. Moreover, because the blank is preformed it is not stretched to any significant extent during the pressing operation and thus tearing or splitting of the interior lining material is avoided.

The foam sheet is preferably perforated. This is particularly useful during a pressing operation such as that described above, since the perforations allow the escape of air and thus avoid or minimise the formation of bubbles between the blank and the substrate. The preformable foam sheet from which the preformed blank is made may be microperforated, in a known manner. Such microperforations generally do not adversely affect the vacuum forming process mentioned above, since the vacuum can be of sufficient strength to overcome any leakage of gas through the blank.

The contoured shape of the preformed blank will generally include smooth curves corresponding to e.g. a recess in the vehicle trim panel. Preferably, the contoured shape of the preformed blank includes a discontinuity, i.e. a sudden change of curvature. This is of particular assistance in achieving correct positioning relative to the substrate. The discontinuity preferably comprises a stepped portion, as this can locate with a corresponding stepped portion on the substrate.

The substrate may be lined with just one interior lining material. However, a preferred method comprises joining the preformed blank to a second interior lining material, and bonding both the preformed blank and the second interior lining material to the substrate. In such circumstances, it can be particularly important that the two interior lining materials are correctly positioned on the substrate, and this is achieved by preforming the blank according to the present invention. The first interior lining material may be substantially surrounded by the second (when the panel is viewed in plan, i.e. from the vehicle interior), and may for example form the lining of a recess in the finished panel. It may be lozenge shaped. In the preferred process mentioned above, in which the preformed blank is supported between first and second pressing tools, it will be appreciated that the second interior lining material provides the support for the first and it can therefore be difficult to maintain the correct position of the first material during the pressing operation. This is because the second interior lining material is normally a limp or "floppy" sheet. If the blank were not preformed, and simply formed a loose "bag" of foam-backed lining material ready for engagement by one of the pressing tools, there would be a tendency for misalignment to occur. However, by preforming the blank according to the present invention, the preformed blank can reposition itself into correspondence with the pressing tool, because both the blank and the tool can have the same contoured shape.

The preformed blank and the second interior lining material may be joined together in various ways, for example using an adhesive, but preferably they are welded together, for example by high frequency welding. The edge of the preformed blank may be trimmed prior to joining it to the second interior lining material, for example in a single operation by a trimming blade.

Where first and second interior lining materials are used, the positioning of the join between them may be important to the appearance of the vehicle trim panel. If a discontinuity as mentioned above is provided in the preformed blank, this is preferably located at or adjacent to the join. In this way it is possible to ensure that the join adopts the correct position relative to the substrate.

A preferred embodiment of the present invention will now be described by way of example and with reference to the following drawings, in which:

FIG. 1 is a cross-sectional view of a vacuum forming tool with a blank thereon;

FIG. 2 is a plan view of the preformed blank after trimming;

FIG. 3 is a plan view of the preformed blank welded to a second blank;

FIG. 4 is a cross-sectional view of the first and second blanks supported on a press frame;

FIG. 5 is an enlargement of the circled portion V shown in FIG. 4;

FIG. 6 is a cross-sectional view of the press frame supported between first and second pressing tools; and FIG. 7 is a cross-sectional similar to FIG. 5 but showing the situation after the pressing tools have been brought together.

Referring to FIG. 1, this shows a blank 1 comprising an interior lining material in the form of a fabric 2 adhesively bonded to a preformable foam sheet 3. The fabric 2 and foam sheet 3 layers can be seen more clearly in FIG. 5. In FIG. 1, the blank is shown positioned on a vacuum forming tool 4 which has a stepped portion 5 at the outer periphery of its female vacuum forming face 6. The tool 4 also has a suction passage 7 for evacuation purposes. The blank 1 is oversized relative to the face 6 so as to project therebeyond.

Preforming of the blank takes place as follows. The oversized blank 1 is heated and is then placed on the vacuum forming tool 4, vacuum is applied via suction passage 7 to pull the blank onto the female vacuum forming face 6, and the blank is left to cool for a period before the vacuum is released and the blank may be removed. A stepped portion 8 is formed in the blank.

During the vacuum forming process the extra material required to fill the recess defined by the face 6 is pulled in at the edges of the blank so that there is no significant stretching of the fabric 2. Accordingly, the blank is preformed to a contoured shape with a stepped portion 8 extending round the periphery of the contoured shape.

In one example, using polypropylene foam, the blank is heated to 160° C. for 40 seconds and following vacuum forming it is left to cool for 20 seconds.

Following preforming, the blank 1 has its edge outwardly of the stepped portion 8 trimmed, so that the preformed blank assumes the lozenge shape in plan view shown in FIG. 2. The trimming may conveniently be affected in a single operation using a cutting press having a trimming blade with the desired lozenge or other shape.

FIG. 3 shows a second blank 9 which may be made of a second interior lining material, such as polyvinylchloride. The second blank 9 is formed at its edge with location holes 10 and centrally with a lozenge-shaped hole 11 in which the preformed blank 1 is located. The preformed blank 1 is welded to the second blank 9 to form a seam 12 therewith. Welding may for example be effected in a high frequency welding press. FIG. 5 shows in more detail the seam 12 between the preformed blank 1 and the second blank 9, as well as the stepped portion 8 formed in the preformed blank 1.

It will be appreciated that if the blank 1 were not preformed to the desired contoured shape, then a loose bag of foam-backed lining material would need to be welded in the hole 11, with the material being pushed out to form the bag shape before being welded. This would require surplus material to be provided at the edge of the material before welding, with the result that once welding has been completed the only practical way to remove the surplus material is to trim it manually. Thus the preforming of the blank has the advantage that the trimming operation is a simple one which can be carried out by e.g. a cutting press before welding.

FIG. 4 shows the welded blanks 1 and 9 positioned on a press frame 13 and located by pins 14 passing through the location holes 10.

FIG. 6 shows the arrangement of the combined blanks 1 and 9 in a press comprising a first pressing tool 15 and a second pressing tool 16. The first tool 15 has a recess 17 having substantially the same contoured shape as the preformed blank 1. The edge of the recess 17 is defined by a peripheral rib 18 and outwardly of the rib a sharp peripheral cutting edge 19 is provided. The second pressing tool 16 is centrally formed with an upwardly projecting contoured portion 20 of a shape corresponding to the recess 17 and the preformed blank 1. Outwardly of the contoured portion 20 a vertically movable dancer 21 is formed in its upper edge with a peripherally extending groove 22 in alignment with the rib 18. Outwardly of the dancer 21 the pressing tool 16 has a lateral edge portion 23 for forming an abutment against which cutting edge 19 is engageable.

The press frame 13 which carries the combined blanks 1 and 9 is supported between the upper and lower pressing tools 15 and 16 by a pair of laterally spaced supports 24. A substrate sheet 25, heated so as to assume a soft, formable condition, is draped over the dancer 21 and pressing tool 16. The substrate may for example be made of a material known as "Woodstock" (trade mark) which is made partly of polypropylene and partly of powdered wood.

FIG. 7 shows the situation when pressing tool 15 is brought down onto pressing tool 16. During the pressing operation the recess 17 of tool 15 engages the preformed blank 1 and because of the matching contoured shapes any misalignment (which may arise due to the fact that the blank 1 is supported by the second blank 9 which is itself flexible) is corrected. The rib 18 of the tool 15 engages the stepped portion 8 of the blank 1 further to ensure correct positioning before the tool 15 reaches the dancer 21. Thus, when the rib 18 engages in the groove 22 of the dancer 21 it has already precisely located the blank 1 so that the seam 12 is accurately pushed into the groove 22. The seam 12 therefore exactly follows the edge of the contoured shape in the panel formed during the pressing operation. Continued downward movement of the pressing tool 15 presses the substrate 25 into shape against the pressing tool 16, with the dancer 21 descending vertically. The cutting edge 19 moves laterally inwardly to trim the outer edge of the panel and then engages against the edge portion 23 of the tool 16. At least one of the supports 24 (the one on the left in FIG. 7) moves laterally outwardly to allow the press frame 13 and the scrap materials to drop away.

Once pressing is complete, the vehicle trim panel may be removed from the press and finished by punching apertures as appropriate and attachment of any additional components such as door bins.

It will be appreciated that if a loosely hanging bag of foam-backed lining material were substituted for the preformed blank 1, then this would give rise to local points of high stress when the bag is shaped to the contoured shape of the tools 15 and 16. This could lead to splitting of the lining material, particularly if it is a material which is not able to stretch to any great extent such as a woven fabric or a plastic or natural material such as leather. By contrast, in the preferred process stretching of the lining material is substantially avoided during the preforming step so that splitting or other damage to the material can be generally minimised. This is in addition to the advantage of ensuring that the seam 12 between the two types of lining material is precisely positioned relative to the recess in the vehicle trim panel.

It will also be appreciated that the references herein to "bonding" of one material to another are intended to cover not only face-to-face bonding, but also bonding of the two materials with an intermediate layer or layers therebetween.

I claim:

1. A method of making a vehicle trim panel, comprising bonding a first interior lining material to a preformable foam sheet to form a blank, preforming the blank to make a preformed blank having a contoured shape, joining the preformed blank to a second interior lining material at a join, and then bonding both the preformed blank and the second lining material to a substrate.

2. A method as claimed in claim 1, wherein the contoured shape of the preformed blank includes a discontinuity.

3. A method as claimed in claim 2, wherein the discontinuity comprises a stepped portion.

4. A method as claimed in claim 1, comprising trimming the edge of the preformed blank prior to joining it to the second interior lining material.

5. A method as claimed in claim 1, wherein the contoured shape of the preformed blank includes a discontinuity.

6. A method as claimed in claim 5, wherein the discontinuity comprises a stepped portion.

7. A method as claimed in claim 6, wherein the stepped portion is located at or adjacent to the join between the preformed blank and the second interior lining material.

8. A method as claimed in claim 7, comprising trimming the edge of the preformed blank prior to joining it to the second interior lining material.

9. A method as claimed in claim 5, wherein the discontinuity is located at or adjacent to the join between the preformed blank and the second interior lining material.

10. A method as claimed in claim 9, comprising trimming the edge of the preformed blank prior to joining it to the second interior lining material.

11. A method as claimed in claim 1, wherein the bonding of the preformed blank to the substrate takes place between first and second pressing tools.

12. A method as claimed in claim 11, wherein the preformed blank and the substrate are supported between said first and second pressing tools which are brought together in a pressing operation, the substrate being pressed to shape it and the preformed blank being bonded thereto during said pressing operation.

13. A method as claimed in claim 12, wherein the preformed blank is suspended between the first and second pressing tools by means of laterally spaced supports.

14. A method as claimed in claim 1, wherein the foam sheet is perforated whereby the perforations allow the escape of air and thus avoid or minimize the formation of bubbles between the preformed blank and the substrate.

15. A method of making a vehicle trim panel, comprising bonding a first interior lining material to a preformable foam sheet to form a blank, preforming the blank to make a preformed blank having a contoured shape, joining the preformed blank to a second interior lining matertial at a join, suspending the preformed blank and the second lining material from supports to position the preformed blank and second lining material between first and second pressing tools, placing a substrate between the first and second pressing tools, and then bringing together the first and second pressing tools in a pressing operation so as to shape the substrate and to bond both the preformed blank and the second lining material to the substrate during said pressing operation.

* * * * *